United States Patent
Jackson et al.

(10) Patent No.: US 7,050,629 B2
(45) Date of Patent: May 23, 2006

(54) METHODS AND SYSTEMS TO INDEX AND RETRIEVE PIXEL DATA

(75) Inventors: Benjamin N. Jackson, Rochester, MN (US); Dhananjay V. Keskar, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 589 days.

(21) Appl. No.: 10/160,491

(22) Filed: May 31, 2002

(65) Prior Publication Data

US 2003/0223638 A1  Dec. 4, 2003

(51) Int. Cl.
*G06K 9/34* (2006.01)
*G06K 9/46* (2006.01)

(52) U.S. Cl. ..................... 382/173; 382/190
(58) Field of Classification Search ............... 382/164, 382/173, 179, 181, 187, 188, 190, 194, 276, 382/305
See application file for complete search history.

(56) References Cited

U.S. PATENT DOCUMENTS

| | | | | |
|---|---|---|---|---|
| 4,396,903 A | * | 8/1983 | Habicht et al. | 382/103 |
| 6,064,767 A | * | 5/2000 | Muir et al. | 382/190 |
| 6,141,442 A | * | 10/2000 | Chen | 382/166 |
| 6,711,287 B1 | * | 3/2004 | Iwasaki | 382/165 |
| 2003/0063801 A1 | * | 4/2003 | Rubinstenn et al. | 382/190 |
| 2003/0108243 A1 | * | 6/2003 | Charpentier | 382/190 |
| 2003/0223638 A1 | * | 12/2003 | Jackson et al. | 382/179 |

* cited by examiner

*Primary Examiner*—Andrew W. Johns
*Assistant Examiner*—Amir Alavi
(74) *Attorney, Agent, or Firm*—Schwegman, Lundberg, Woessner & Kluth, P.A.

(57) ABSTRACT

Methods and systems are provided to index and retrieve pixel data. Pixel data is received, and connected pixel components are identified. The connected pixel components are associated with segments. Spatial invariant features are extracted for each of the segments, and keys are acquired for each segment. The features and keys are associated with one another and indexed in a data store for subsequent retrieval.

25 Claims, 5 Drawing Sheets

METHODS AND SYSTEMS TO INDEX AND RETRIEVE PIXEL DATA

TECHNICAL FIELD

Embodiments of the present invention relate generally to image processing and more specifically to the indexing and retrieval of pixel data identified in an electronic image.

BACKGROUND INFORMATION

Although print media continues to be digitized and made available in electronic media, a large portion of print media remains disconnected from related and useful electronic data. By and large, one significant disconnect can occur when information is embodied as electronic image data, since before the image data can be of any valuable use in an electronic environment the pixel data contained within the image data must be identified, logically grouped into related segments, and associated with meaningful electronic data structures that are recognized within the electronic environment having electronic media.

For example, handwritten data residing on a printed media is of little use if scanned into an electronic environment and only represented as a single electronic image that consists of a plurality of pixels. However, if the pixel data is logically grouped into segments and processed by an optical character recognition (OCR) set of executable instructions, operating within the electronic environment, then the electronic image becomes a series of electronic character data structures which can be integrated and linked to other electronic media within the electronic environment. These electronic characters can then be further integrated and processed by additional executable instructions within the electronic environment to provide an integrated use for the handwritten data. For example, the handwritten data could be loaded into a word processor or email, indexed or stored in a data store for later retrieval, or linked with other valuable electronic data related to the handwritten data.

Yet, even if pixel data is properly translated into a useful electronic media format, the translated format can still be difficult to retrieve when a request for the original captured electronic image is later made within the electronic environment by using the original print media as a search request. This is so, because unless a proper identifier or tag, associated with the print media, is obtained for the original print media used as a search request, then a search to retrieve the desired electronic image will fail. For example, if an electronic image is initially scanned, translated, indexed, and stored in a data store, and a subsequent request for the scanned, translated, and indexed electronic image is made using the original print media, which represents the electronic image, then unless a proper identifier or key is associated with the original print media, a retrieval request will be unable to properly locate the translated and indexed electronic image within the electronic environment.

Some existing techniques attempt to uniquely identify or tag electronic images within the electronic environment by manually placing an electronic bar code label on the original print media, and in this way when a subsequent request to retrieve the electronic image is made, a scan of the bar code label on the print media results in a unique identifier that can then be used to properly retrieve the translated and indexed electronic image and any related electronic data. However, the bar code labels can become damaged and require manual intervention and maintenance. Furthermore, with the addition of a bar code label placed on the print media, the print media is altered to include a label permanently affixed to the print media.

Additionally, if the print media is associated with a plurality of printed pages assembled as a single document, further complicated techniques must be employed such that if a request is made for a certain page occurring after the first page of the document, the certain page can be properly retrieved, since often only the first page of the document will include a bar code label. Therefore, if the document includes a large number of printed pages, a request for a page occurring near the end of the document may result in the first page of the document being retrieved forcing a user to serially traverse a series of electronic images to locate the desired electronic page represented the desired printed page. As one of ordinary skill in the art will readily appreciate, bar coding techniques explicitly tag electronic image data by manually inserting a bar code label, and these techniques have a number of limitations and problems.

Other techniques to uniquely identify print media within an electronic environment require a special print media paper to be used, such that the special paper transparently includes a unique electronic identifier that is recognized when scanned into the electronic environment. These techniques are capable of uniquely identifying each page of a multi-paged document, but the techniques require users to buy and use a special paper for all print media scanned into the electronic environment. Still further techniques, use a handwritten signature affixed to a print media as a bar code like identifier. But, these techniques uniquely identify and retrieve a class of electronic images associated with a particular author and not a specific electronic image associated with the author. As a result, the user must filter through numerous retrieved and possibly unrelated electronic images to locate the desired image.

Furthermore, conventional techniques to translate pixel data have used OCR techniques when the print media is text data (e.g., alphabetic characters, numeric characters, or symbol characters) or image pattern matching techniques when the print media is related to graphical data (e.g., pictures, graphical symbols, shapes, and the like). Both techniques facilitate the translation of the scanned print media into meaningful electronic data structures, but neither technique addresses how the content of the print media can be uniquely identified and tagged for efficient indexing and retrieval within the electronic environment. To address this issue, some techniques will use the entire originally provided print media as a search request to retrieve the desired electronic image. Yet, providing the entire originally provided print media, as a search request, is often not feasible, is processor-intensive and memory-intensive, and is time consuming.

Accordingly, current pixel data indexing and retrieval techniques are not flexible enough to truly integrate print media within an electronic environment, which may have useful additional electronic data. Therefore, there exists a need for improved pixel data indexing and retrieval techniques.

DESCRIPTION OF THE EMBODIMENTS

Novel pixel data indexing and retrieving techniques are described. In the following detailed description of the embodiments, reference is made to the accompanying drawings, which form a part hereof, and in which is shown by way of illustration, but not limitation, specific embodiments of the invention may be practiced. These embodiments are described in sufficient detail to enable one of ordinary skill in the art to understand and implement them, and it is to be understood that other embodiments may be utilized and that structural, logical and electrical changes may be made without departing from the spirit and scope of the present disclosure. The following detailed description is, therefore, not to be taken in a limiting sense, and the scope of the embodiments of the inventions disclosed herein is defined only by the appended claims.

Figure 1:
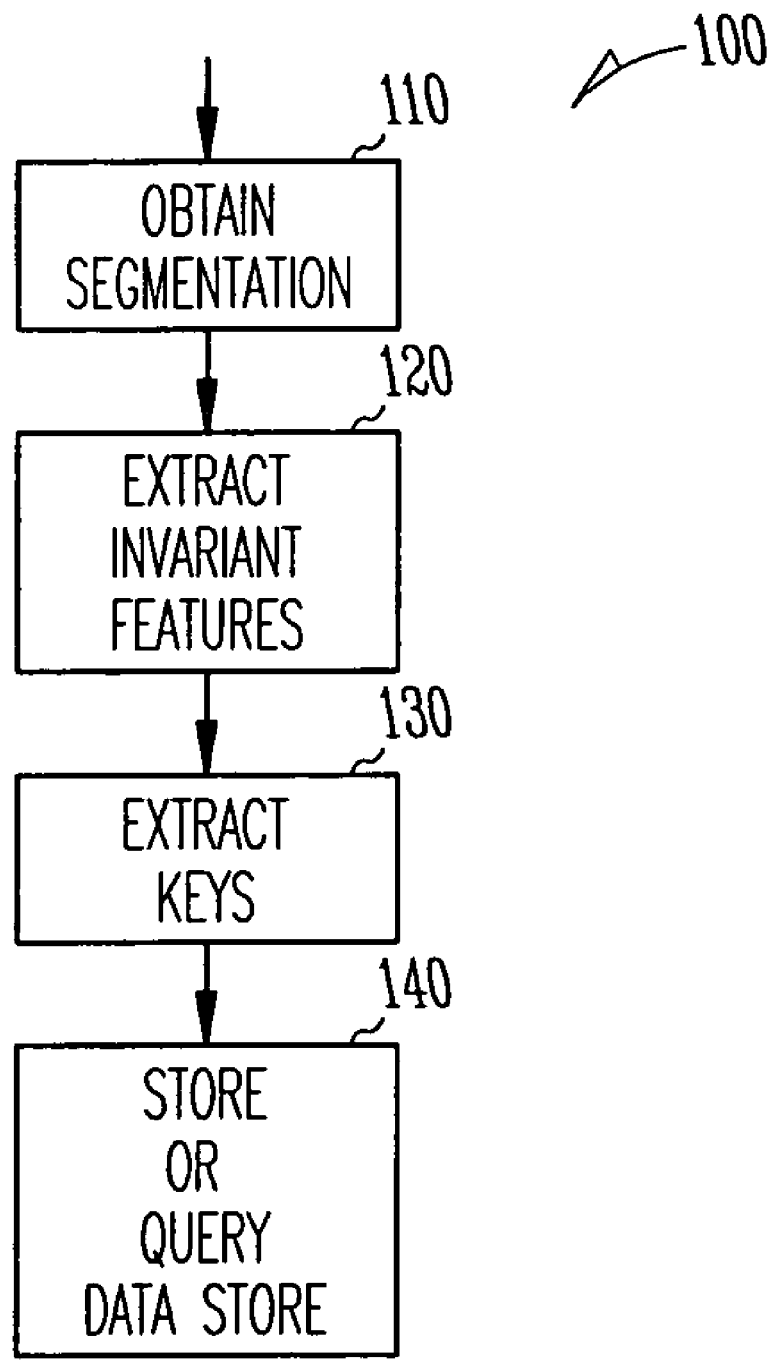
FIG. 1 is a flow diagram of a method to index and retrieve pixel data, in accordance with one embodiment of the invention.

FIG. 1 is a flow diagram for one method 100 to index and retrieve pixel data, in accordance with one embodiment of the invention. Initially, print media is scanned and made available as pixel data in an electronic environment. In some embodiments, the print media is a handwritten page and is scanned into the electronic environment using a scanning device in communication with a computing device. The pixel data is retained in a memory associated with the computing device. Next, the pixel data is separated into two categories, pixel background data and pixel foreground data. The pixel background data, in some embodiments, is considered noise data and is filtered out of the pixel data to acquire only the pixel foreground data. The pixel foreground data includes a series of connected pixel data segments representing desired electronic data, such as alphabetic characters, symbol characters, numeric characters, and the like. In some embodiments, the pixel foreground data is the ink contained on the scanned printed media representing handwritten content.

Once the pixel foreground data is filtered from the pixel background data, the pixel foreground data is synthesized to identify connected pixel data segments. Connected pixel data includes pixels that are continuously connected within the pixel data. In some instances, a connected pixel data can represent a single alphabetic character. In other instances, connected pixel data can represent a partial or complete word that was connected in one continuously connected pixel stream (e.g., a cursive word). In still more instances, a connected pixel data is a partial character such as the base or stem of the letter "i," since the letter "i" appears as two separate connected pixel segments.

In 110, identified connected pixels are obtained or otherwise identified as segments within the entire collection of pixel data obtained from the scanned printed media. Each segment appears within the entire collection of pixel data having an originally obtained orientation and distance from each of the remaining segments. This angular orientation and distance represent each segment's spatial features within the scanned printed media. In some embodiments, these spatial features for each segment can be made invariant with respect to each segment's translation, rotation, and scale as the segment appears in the originally scanned printed media. In other words, the translational, rotational, and scaling factors of any segment can be mathematically and statistically normalized such that a particular feature of the segment can be derived regardless of any subsequently obtained sample of the segment, where the sample can include a different translational, rotational, or scaling factor for the segment.

Obtaining translational, rotational, and scaling invariant mathematical normalizations for a given translation, rotation, or scaling factor, is readily recognized by, and available to, one of ordinary skill in the art, and a variety of existing statistical and mathematical techniques and algorithms exist to achieve such normalizations. All such techniques and algorithms are intended to fall within the embodiments of the present disclosure. For example, Fourier transforms techniques and log-polar mapping techniques can be used to produce translational, rotational, and scaling invariant features for each segment.

In this way, invariant translational, rotational, and scaling features are extracted or otherwise derived for each segment in 120. These features are then used to extract data store keys in 130. As one of ordinary skill in the art will readily appreciate, the data store keys need not be unique data base keys, and in this way a single segment is associated with a plurality of invariant features and data store keys. In some embodiments, the data store is a single database, a plurality of databases, a web site, a plurality of web sites, a file system, a directory, one or more storage devices, one or more removable computer readable media, or a combination of any of the above mentioned data storage areas.

Once the invariant features and keys are extracted for each segment included within the pixel data, the pixel data is completely indexed and ready for more efficient electronic storage that facilitates improved electronic retrieval of the originally scanned printed media. Furthermore, the indexed version of the pixel data can be used to subsequently recreate the original pixel data in its entirety. In this way, the pixel data need not be stored within the electronic environment, or on any removable computer readable medium, in its originally acquired format for subsequent retrieval. Moreover, the indexed version of the pixel data can be linked to other valuable electronic data within the electronic environment, providing a more integrated and useful experience for a consumer of the originally scanned printed media.

For example, a scanned handwritten page representing notes related to a meeting of a user can be indexed according to one embodiment of the invention and linked within the electronic environment to a web site (e.g., uniform resource locator (URL) hypertext link), a group of email messages, a group of related files, a group of contact information, a presentation file, and the like. In this way, the print media environment of the user is more easily linked and integrated to the user's electronic media environment.

Furthermore, in 140 the indexed pixel data can be stored in a data store, which permits subsequent retrieval of the indexed pixel data with any subsequent data store query. And, since each segment of the pixel data was indexed and stored in the data store with invariant features and keys, any subsequent query to obtain the original pixel data and any related and linked electronic data do not require a rescan of the entire originally provided scanned printed media. Moreover, no bar code label, uniquely identifying tag, special print media, or handwritten signature is required to subsequently retrieve the original pixel data and any related and linked electronic data.

When a subsequent search for the pixel data is made, all that is required to retrieve and locate the indexed pixel data is a small scan or swipe sample of the originally provided printed media. Further, since the indexed features for each segment of the pixel data are invariant, there is no requirement that the scan or swipe sample occur at any particular angular orientation with respect to the printed media. This is so, because regardless of the angular orientation of the scan or swipe, a match to retrieve the original pixel data is achieved for the scanned or swiped sample by using invariant features associated with segments of the sample as compared to the invariant features of the indexed segments for the indexed and stored pixel data.

The scanned or swiped sample is processed in the same manner as described above when a subsequent query is requested. Correspondingly, segments are constructed from the sample, and each segment includes extracted invariant features and keys. An initial search, in some embodiments, is made using only the keys of the sample against the data store to obtain an initial answer set of candidate indexed segments. Next in one embodiment, the retrieved answer set is filtered by using the invariant features of the sample to acquire a matching indexed pixel data associated with the sample contained within the answer set.

Furthermore in one embodiment, in order to improve query response time, three segments from the sample are randomly selected. These three segments, along with their concomitant invariant features, are then used as a query to the data store for the indexed query data. Moreover, in one embodiment the three selected segments from the sample are selected such that each segment is at a sufficiently large distance from one another within the sample.

For example, three segments can be selected where two of the selected segments are at the greatest distance within the sample from one another along an x-axis and occur at the lowest point along a y-axis, and the third segment is selected at the furthest most point along the y axis within the sample but at a midpoint along the x-axis. In this way, the three selected segments can be said to create a geometric triangle within the sample. As one of ordinary skill in the art will readily appreciate, a variety of techniques can be used to filter the segments of the sample in order to improve the processing throughput and response time of the query, all of which are intended to fall within the various embodiments of the present disclosure.

Additionally, the pixel data of the originally provided scanned media can be processed, where appropriate (e.g., text data), using existing OCR techniques to provide additional electronic integration between the print media and various electronic media. All such additional processing can be linked to the indexed pixel data of the above-disclosed embodiments to further augment the present disclosure.

Figure 2A:
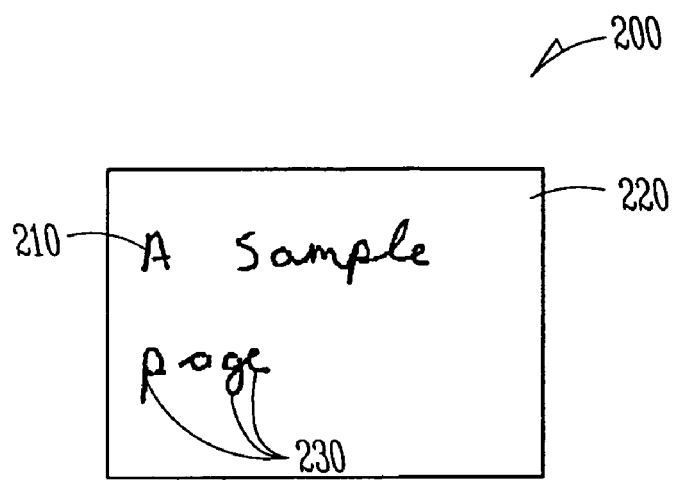
FIG. 2A is a diagram of an example print media, in accordance with one embodiment of the invention.

FIG. 2A is a diagram of one example print media 200, in accordance with one embodiment of the invention. Print media 200 depicts an example of a page of text having handwritten content depicted as "A sample page." The print media is scanned into an electronic environment and is represented as a collection of pixel data 210, 220, and 230. The pixel data includes background or noise pixel data 220, and foreground pixel data (e.g., 210 and 230). The foreground pixel data (e.g., 210 and 230), in some embodiments, is acquired by distinguishing between the intensity of light associated with ink occurring on the print media 200 for the foreground pixel data (e.g., 210 and 230) when compared with the intensity of light associated with the background or noise pixel data 220.

Furthermore, the foreground pixel data (e.g., 210 and 230) is grouped together to form connected foreground pixel data. The connected foreground pixel data represents continuously connected pixel data occurring within the print media 200. For example, the single alphabetic character "A" 210 is identified as a collection of continuously connected pixel data. Moreover, pixel data 230 includes three continuously connected pixel segments namely "p," "a," and "ge." The pixel data "ge" is a single continuously connected pixel segment, since it is handwritten in unbroken cursive on the print media 200.

Each connected pixel data 210 and 230 are identified as a segment. Each segment has extracted features, in some embodiments the features include pixel distances occurring between each segment with respect to the remaining segments and the angular orientation of each segment with respect to the remaining segments. The features are made translational, rotational, and scaling invariant using mathematical techniques and algorithms well known and available to one of ordinary skill in the art. Next, in some embodiments the features are used to acquire data store keys for each of the segments, and each segment along with its invariant features and keys are stored in the data store using the acquired data store keys.

In this way, the pixel data associated with the print media 200 of FIG. 2A is processed and indexed such that the pixel data can be later retrieved from a data store by using any of the identified segments of the print media 200 as a unique identifier. The print media 200 does not require a bar code label, a signature, or special paper in order to be indexed or later retrieved from the data store. In fact, the print media 200 is automatically and implicitly tagged, indexed, and stored in the data store.

Figure 2B:
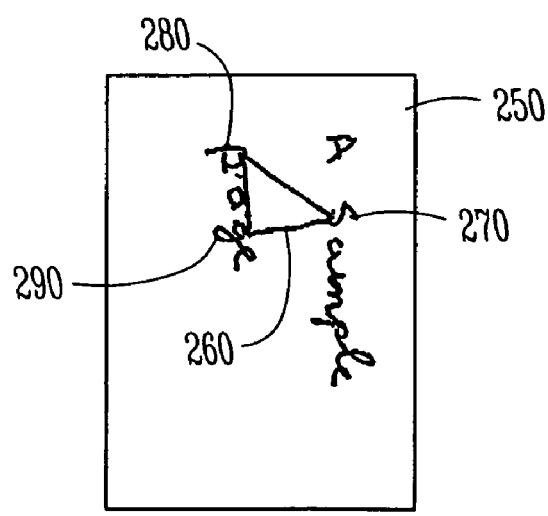
FIG. 2B is a diagram of an example print media with a rotated orientation, in accordance with one embodiment of the invention.

FIG. 2B is a diagram of one example print media 250 with a rotated orientation, in accordance with one embodiment of the invention. FIG. 2B provides a rotated perspective view of FIG. 2A. In one example embodiment provided by FIG. 2B, the rotated orientation of the print media 250 is acquired as a result of a data store query to acquire the originally indexed pixel data and any associated electronic data related to the indexed pixel data of FIG. 2A. FIG. 2B illustrates that a query to obtain the originally indexed pixel data and any associated electronic data can be made by scanning the print media 250 at any angular orientation. Moreover, although print media 250 includes all the pixel data originally provided in FIG. 2A as a query, no such requirement is necessary with the embodiments of the present disclosure. In fact, only a small sample of the originally provided pixel data need be used as a query.

A search to retrieve the original indexed pixel data represented by print media 250, which is provided as a search query, proceeds by identifying connected pixel data as segments and extracting invariant features and keys as described above in FIG. 2A. Next, in one embodiment three segments namely "S" 270, "p" 280, and "ge" 290 are selected from the query. The keys associated with these three segments are submitted to a data store, and a plurality of candidate segments associated with a plurality of indexed pixel data is returned as an answer set. Next in one embodiment, the answer set is further filtered using the invariant features associated with the three segments 270–290 to retrieve the desired indexed pixel data associated with the initial query.

One of ordinary skill in the art will readily appreciate that the above-described embodiments permit more efficient indexing and retrieval of pixel data having a variety of applications to integrate print media with electronic media.

Consider, by way of example only, a user who has scanned a variety of pages of text into an electronic environment using the indexing techniques of the present disclosure. Each page of text, once represented within the electronic environment, is further linked to additional relevant electronic data important to the user. Next, at some later point in time when the user is attending a meeting, a particular page of the text associated with notes of the user becomes relevant to the user. The user can use a pen scanner, interfaced to his laptop-computing device or a personal digital assistant (PDA), to take a swiped scan of the particular page at any angular orientation capturing only a small sample of the pixel data included on the particular page. The laptop or PDA is networked (e.g., hardwired or wirelessly) to the data store, and the swipe is translated into segments, keys, and invariant features, using the techniques of the present disclosure and submitted to the data store as a query. The query then immediately returns the particular page and its associated links to presentations, reports, web sites, and the like to the user on the laptop or PDA for consumption by the user. Of course, a variety of additional applications can be deployed with the tenets of the present disclosure, and all such applications are intended to fall within the scope of the present disclosure.

Figure 3:
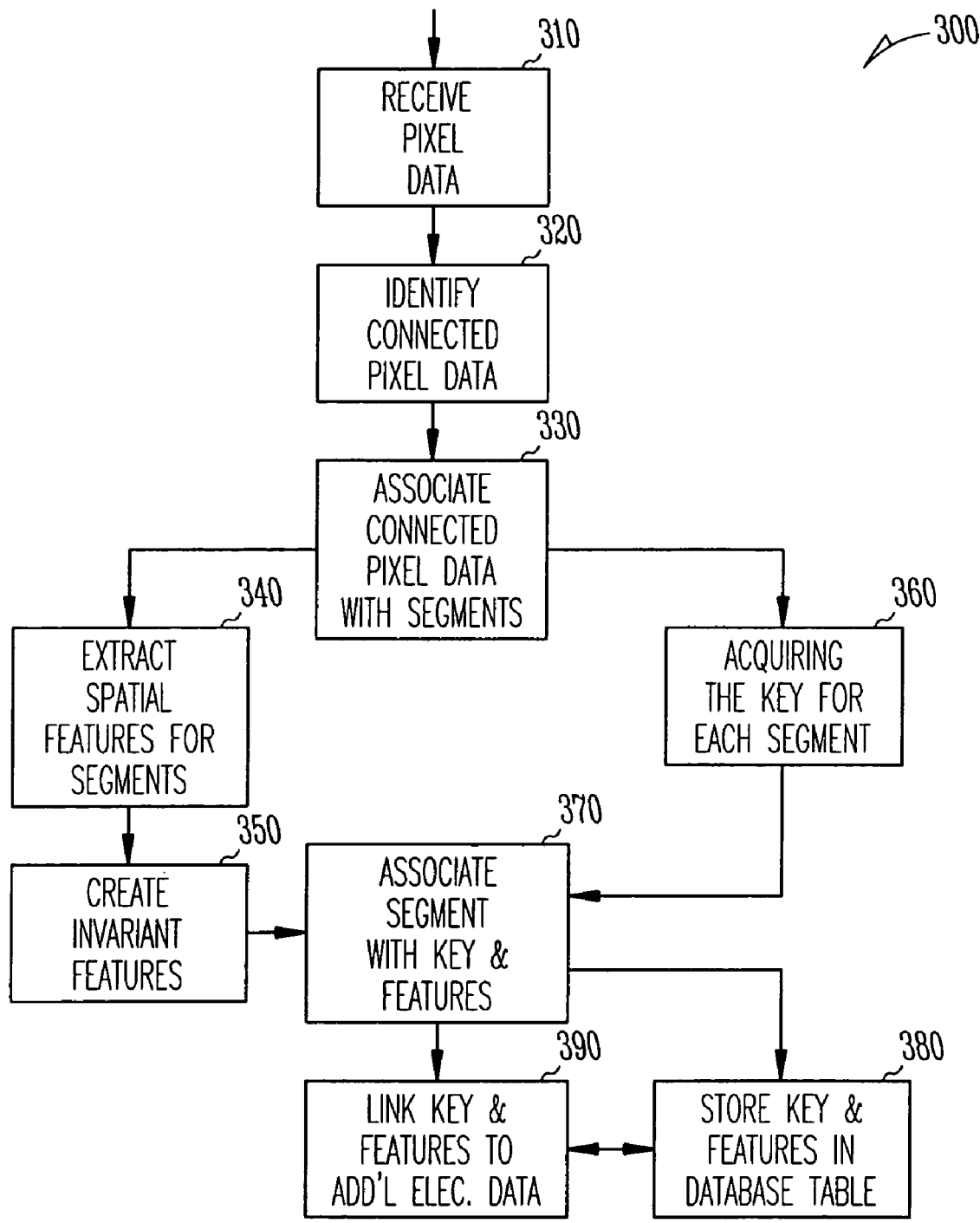
FIG. 3 is a flow diagram of a method to index pixel data, in accordance with one embodiment of the invention.

FIG. 3 is a flow diagram of one method 300 to index pixel data, in accordance with one embodiment of the invention. Initially, in 310 pixel data is received from an electronic image. In one embodiment, the electronic image was acquired from print media and depicts handwritten content. Next, each pixel embodied within the image is identified as collections of connected pixel data segments in 320. Each collection of connected pixel data segments is then associated as a single segment in 330.

In 340, features are extracted for each segment. In some embodiments, features include pixel distances occurring between each segment with respect to the remaining segments included within the electronic image. Further in more embodiments, features also include angular orientations occurring between each segment with respect to the remaining segments included within the electronic image. The features are then normalized so as to become translational, rotational, and scaling invariant in 350. As one of ordinary skill in the art will readily appreciate, the normalization can be employed using well-known and readily available mathematical and statistical techniques and algorithms (e.g., Fourier transforms, log-polar mapping, and others).

Keys are acquired for each of the segments in 360 from a data store. The keys within the data store need not be unique, and in some embodiments the extracted features are used to generate the keys from the data store. The keys permit the segments to be stored and associated within the data store. Once keys are obtained from the data store, each segment and its invariant features and keys are associated with one another in 370 and stored in the data store in 380. In some embodiments, each segment and its invariant features and keys are stored in a database table accessible to a plurality of databases and database applications.

The indexed segments, once stored in a data store, can then be associated and appropriately linked to a variety of additional electronic data in 390. As one of ordinary skill in the art readily recognizes, a plethora of commercially available database applications permit a variety of electronic media to be logically associated and linked from database tables and records associated with databases. Accordingly, associating and linking the indexed segments is readily achieved with any of the various embodiments of the present disclosure.

Figure 4:
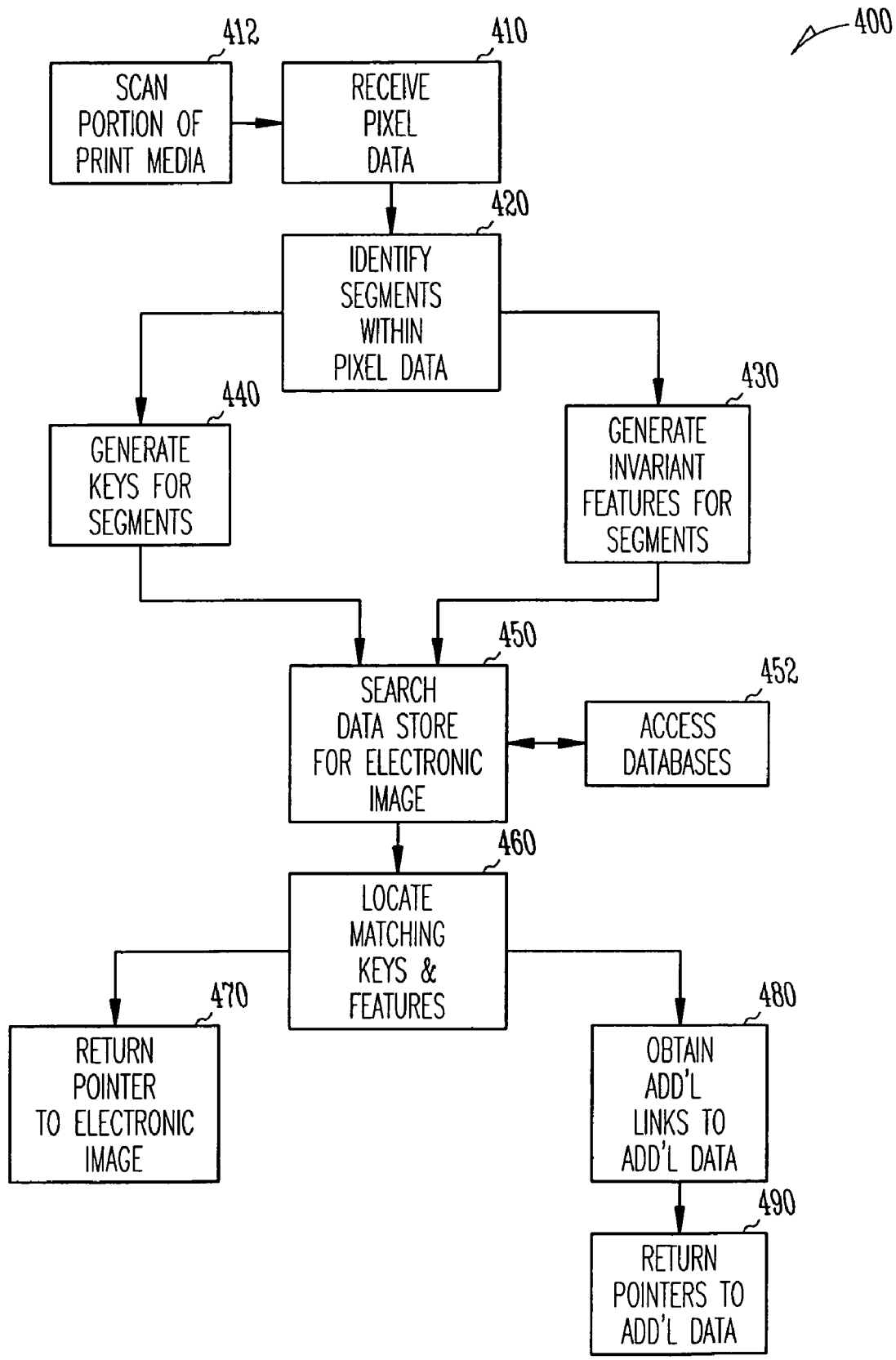
FIG. 4 is a flow diagram of a method to retrieve pixel data, in accordance with one embodiment of the invention.

FIG. 4 is a flow diagram of one method 400 to retrieve pixel data, in accordance with one embodiment of the invention. In 410 pixel data is received from an electronic image. In one embodiment, the electronic image is a scanned sample from only a portion of a print media as depicted in 412. For example, the print media can be a piece of paper containing handwritten data. Moreover, in one embodiment the scanned sample is acquired from a handheld scanning device such as a pen scanner. The scanned sample of the print media can include only a small sample of the entire print media, and the scanned sample can occur in any direction or angular orientation within the print media.

The scanned sample is recognized as a collection of pixels appearing within the scanned sample. Background pixels are distinguished from foreground pixels, and connected pixels are identified as segments in 420. Invariant features are generated for each identified segment in 430. In one embodiment, the features are extracted for each segment based on each segments distance and angular orientation with respect to the remaining segments occurring within the sample. Moreover, the features are normalized so as to become translational, rotational, and scaling invariant by using existing mathematical and statistical techniques and algorithms (e.g., Fourier transforms, log-polar mapping, and others).

Keys are generated for each of the segments in 440. In some embodiments, the invariant features are used in combination with a data store application to acquire keys for each of the segments. Although as one of ordinary skill in the art will readily appreciate, the keys need not be unique data store keys, and any key-generating set of executable instructions can be used with the various embodiments of the disclosure.

Once the segments are identified, the keys generated, and the invariant features generated, then a query is formed and used to search the data store in 450. In some embodiments, the data store is a plurality of databases, and correspondingly the search is made to access the databases in 452. In one embodiment, only three randomly selected segments and their associated keys and features are submitted to the data store as a query. In this way, the processing performance and correspondingly query response time of the search can be improved. In still further embodiments, only the keys, or three keys as the case may be, are submitted to the data store as a query. In these embodiments, the answer set returned from the data store in response to the query is then filtered using the features from the submitted keys to acquire matching segments corresponding to the sample.

In 460, matching keys and features are located and a reference is provided to data store records that are associated with the electronic image. Accordingly, a pointer to the electronic image and its associated records are returned in 470. In one embodiment, the electronic image is dynamically reconstructed using all the indexed segments associated with the electronic image, and a pointer to the dynamically reconstructed electronic image is provided in 470. Moreover, in some embodiments the associated records are used to obtain additional electronic links to additional electronic data related to the electronic image in 480. And, in 490 pointers to the additional electronic data are returned.

Figure 5:
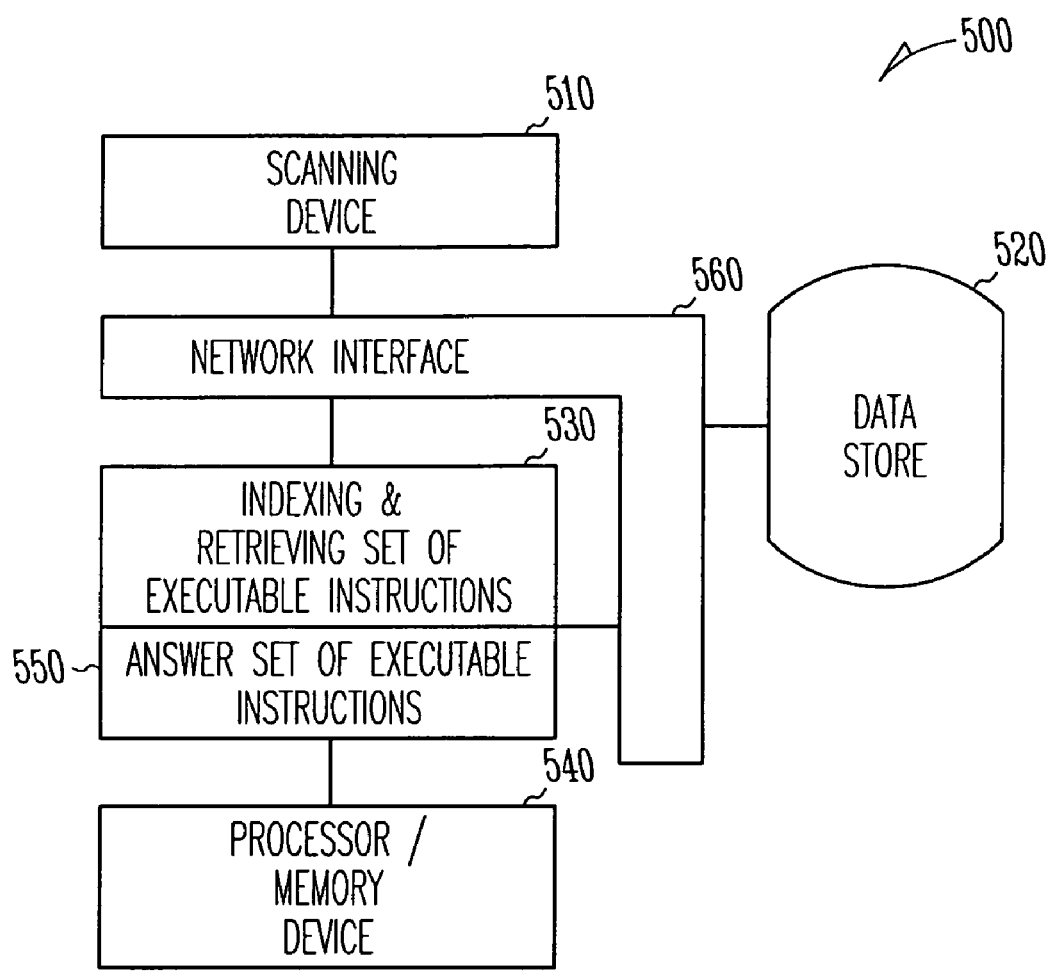
FIG. 5 is a block diagram of pixel data processing system, in accordance with one embodiment of the invention.

FIG. 5 is one block diagram of a pixel data processing system 500, in accordance with one embodiment of the invention. The pixel data processing system 500 includes a scanning device 510, a data store 520, and an indexing and retrieving set of executable instructions (IR) 530. The IR 530 operates on a processor/memory device 540. However, as one of ordinary skill in the art will readily recognize, the IR 530 can operate and reside on multiple processor/memory devices 540, and a single processor/memory device is not required.

The data store 520 includes keys associated with segments having one or more invariant features. In some embodiments, the data store is a collection of databases. In other embodiments the data store is a single database. The segments are associated with previously extracted connected pixel segments acquired from one or more electronic images. The invariant features are normalized spatial data representing pixel distances and angular orientations occurring between segments associated with the same electronic image, which is indexed and stored in the data store 520 using the keys and based on the electronic image's individual segments.

The IR 530 receives pixel data from the scanning device 510 and identifies connected pixel data groups within the pixel data as segments. The scanning device 510 can be in communication with a separate processor/memory device (not illustrated) and use a separate set of processing instructions to provide the pixel data to the IR 530, or the scanning device 510 can use the same processor/memory device 540 used by the IR 530. Moreover, the scanning device 510, the data store 520, and the IR 530 are interfaced via a network interface 560. The network interface 560 can be hardwired or wireless, and the network can be achieved through a local area network, a wide area network, or the Internet. Furthermore, in some embodiments the scanning device 510, the data store 520, and the IR 530 are remote from one another.

The IR 530 uses the identified segments derived from the pixel data to generate candidate invariant features for each of the segments and to acquire candidate keys from the data store 520 for each of the segments. Moreover, the IR 530 uses the segments, the candidate invariant features, and the candidate keys to search the data store 520 in order to locate references to one or more candidate keys having the candidate invariant features within the data store 520.

In some embodiments, the IR 530 first filters the available candidate invariant features and candidate keys before querying the data store 520 in order to improve the data store's 520 response times to the submitted query. In these embodiments, the IR 530 communicates with an answer set of executable instructions 550 in order to process an answer set of potential matching keys that are received from the data store 520. The answer set of executable instructions 550 uses the candidate invariant features to locate a match within the provided answer set. Moreover, the answer set of executable instructions 550 acquires and provides a pointer to an image associated with a complete electronic image represented by the query. In some embodiments, a pointer to related electronic data associated with the image is also provided.

One of ordinary skill in the art will understand, upon reading and comprehending this disclosure, the manner in which software instructions can be written and installed to execute on one or more processors in a computer-based system to perform the methods disclosed herein. One of ordinary skill in the art will further understand that various programming languages may be employed to create software instructions designed to implement and perform the methods and systems of the present disclosure. For example, the programs can be structured in an object-orientation using an object-oriented language such as Java, Smalltalk or C++, and the programs can be structured in a procedural-orientation using a procedural language such as COBOL, C, assembler, or micro-code. The software components communicate in any of a number of ways that are well known to those skilled in the art, such as application program interfaces (API) or interprocess communication techniques such as remote procedure call (RPC), common object request broker architecture (CORBA), Component Object Model (COM), Distributed Component Object Model (DCOM), Distributed System Object Model (DSOM) and Remote Method Invocation (RMI). However, as will be appreciated by one of ordinary skill in the art upon reading this disclosure, the teachings of the present disclosure are not limited to a particular programming language or any particular programming environment.

It is to be understood that the above description is intended to be illustrative, and not restrictive. Many other embodiments will be apparent to those of skill in the art upon reviewing the above description. The scope of embodiments of the invention should, therefore, be determined with reference to the appended claims, along with the full scope of equivalents to which such claims are entitled.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Description of the Embodiments, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject mater lies in less than all features of a single disclosed embodiment. Thus the following claims are hereby incorporated into the Description of the Embodiments, with each claim standing on its own as a separate exemplary embodiment.

What is claimed is:

1. A method to index pixel data, comprising:
   receiving pixel data from an electronic image;
   identifying connected pixel data as a plurality of segments;
   acquiring keys for a number of the plurality of segments; and
   extracting one or more invariant features for the number of the plurality of segments.

2. The method of claim 1 further comprising storing the number of keys and the number of the one or more invariant features in a database table.

3. The method of claim 1 wherein in extracting, the number of the one or more invariant features represent invariant translated segments, invariant scaled segments, and invariant rotated segments.

4. The method of claim 1 wherein in extracting, the number of the one or more invariant features include distances between segments and angular orientations between segments.

5. The method of claim 1 further comprising linking the number of the one or more invariant features and the number of the keys with additional electronic data.

6. The method of claim 1 wherein in receiving, the pixel data received from the electronic image represents handwritten data.

7. A method to locate pixel data, comprising:
   receiving pixel data, wherein the pixel data represents a portion of an electronic image;
   identifying segments within the pixel data;
   generating keys and invariant features for each of the identified segments; and searching a data store using the keys and the invariant features to locate the electronic image within a data store.

8. The method of claim 7, further comprising returning a pointer to the electronic image.

9. The method of claim 7, further comprising returning additional pointers to additional electronic data associated with the electronic image.

10. The method of claim 7 wherein in receiving, the portion of the electronic image is received from a handheld scanning device which scans a portion of a printed media representing the electronic image.

11. The method of claim 10 wherein in receiving, the scan occurs in any angular orientation or direction across the printed media.

12. The method of claim 7 wherein in searching, the electronic image is located when the keys match electronic image keys and the invariant features match electronic image invariant features.

13. The method of claim 12 wherein in searching, the invariant features and the electronic image invariant features include spatial dimensions occurring between the invariant features and occurring between the electronic image invariant features.

14. The method of claim 7 wherein in searching, the data store comprises one or more databases.

15. An article comprising a computer-readable medium having associated instructions implemented thereon, wherein the instructions, when accessed by a machine result in the machine performing the method of:
    receiving an electronic image representing handwritten data;
    identifying connected pixel data associated with the image;
    extracting invariant features for segments associated with the connected pixel data;
    generating keys for each of the segments;
    associating each key with one or more of the invariant features; and
    storing each key and each of the invariant features in a data store.

16. The article of claim 15, further comprising:
    receiving a sample image representing a portion of a desired electronic image;
    extracting candidate invariant features for candidate segments associated with the sample image;
    generating candidate keys for each of the candidate segments;
    associating each candidate key with one or more of the candidate invariant features; and
    searching the data store for matching keys having matching invariant features which are associated with the desired electronic image.

17. The article of claim 16, wherein in receiving the sample image, the sample image is an electronic scan of any portion of a print media representation of the desired electronic image.

18. The article of claim 16 further comprising, returning a pointer to the desired electronic image along with pointers to additional electronic data associated with the desired electronic image.

19. The article of claim 16 wherein in receiving the sample image, the sample image is received from a handheld scanning device.

20. The article of claim 19 wherein in receiving the sample image from the handheld scanning device, the sample image is obtained from the handheld scanning device off of a print media at any angular orientation or direction across the print media.

21. The article of claim 16, wherein in receiving the sample portion of the electronic image, the sample portion of the electronic image is received from a pen scanning device by taking a sample swipe of the print media.

22. An article comprising a computer-readable medium having associated instructions implemented thereon, wherein the instructions, when accessed by a machine result in the machine performing the method of:
    receiving a sample portion of an electronic image from a print media at any angular orientation or direction across the print media;
    extracting candidate invariant features for candidate segments associated with the sample portion of the electronic image;
    generating candidate keys for each of the segments; and
    searching a data store for matching keys with matching invariant features using the candidate keys and the candidate invariant features.

23. The article of claim 22 further comprising presenting a matching electronic image associated with the matching keys and the matching invariant features.

24. The article of claim 23, wherein in presenting the matching electronic image, the matching electronic image represents a complete replica of the print media.

25. The article of claim 24, wherein in presenting the matching electronic image, the complete replica is constructed from index keys and index invariant features included in a data store.

* * * * *